239-206
3/31/87 US Re 32,386

United States Patent [19]

Hunter

[11] E Patent Number: Re. 32,386

[45] Reissued Date of Patent: Mar. 31, 1987

[54] SPRINKLER SYSTEMS

[75] Inventor: Edwin J. Hunter, Rancho Santa Fe, Calif.

[73] Assignee: The Toro Company, Minneapolis, Minn.

[21] Appl. No.: 800,794

[22] Filed: Nov. 22, 1985

Related U.S. Patent Documents

Reissue of:

[64] Patent No.: 3,854,664
Issued: Dec. 17, 1974
Appl. No.: 405,690
Filed: Oct. 11, 1973

U.S. Applications:

[63] Continuation of Ser. No. 346,445, Mar. 30, 1973, abandoned.

[51] Int. Cl.[4] ..... B05B 3/16

[52] U.S. Cl. ..... 239/206; 239/240

[58] Field of Search ..... 239/201, 203, 204, 206, 239/240, 241, DIG. 1

[56] References Cited

U.S. PATENT DOCUMENTS

| | | | |
|---|---|---|---|
| 2,990,120 | 6/1961 | Reynolds | 239/97 |
| 3,131,867 | 5/1964 | Miller et al. | 239/97 |
| 3,526,363 | 9/1970 | Hauser | 239/206 |
| 3,645,451 | 2/1972 | Hauser | 239/206 |
| 3,702,678 | 11/1972 | Hauser | 239/206 |

*Primary Examiner*—Andres Kashnikow
*Attorney, Agent, or Firm*—Robert V. Jambor

[57] ABSTRACT

Improvements in sprinkler systems having fluid under pressure flowing therethrough and a sprinkler head with a pop-up nozzle actuated by fluid pressure. An impeller is actuated by the fluid flow to rotate the nozzle and thus rotate the spray of fluid therefrom. A transmission is disposed between the impeller and the nozzle for transmitting rotation of the impeller to the nozzle. The transmission is sealed off from the fluid passing through the system by a resilient expandable diaphragm at one end. A fluid pressure responsive seal is provided in the system in sealing engagement with the nozzle. The sealed-off portion of the transmission is completely filled with a lubricating medium which is free to selectively contract or expand against the diaphragm in response to varying ambient conditions encountered by the sprinkler head. The nozzle may also include means for varying the pattern of the sprayed fluid and may be comprised of molded plastic components which may be assembled together.

32 Claims, 13 Drawing Figures

SPRINKLER SYSTEMS

Matter enclosed in heavy brackets [ ] appears in the original patent but forms no part of this reissue specification; matter printed in italics indicates the additions made by reissue.

This is a continuation, of application Ser. No. 346,445, filed Mar. 30, 1973.

*Original U.S. Pat. No. 3,854,664 was subject to two reexamination proceedings: Reexamination Proceeding Control No. 90/000,089, filed October 11, 1973, reexamination vacated Feb. 12, 1982; and, Reexamination Control No. 90/000,542, resulting in Reexamination Certificate B1 3,854,664, issued Jan. 21, 1986.*

BACKGROUND OF THE INVENTION

1. Field of the Invention:

The invention relates to sprinkler systems; and, more particularly, to improvements in sprinklers used in such systems wherein water under pressure causes the sprinkler head and nozzle thereof to pop-up to disperse water therefrom.

2. Description of the Prior Art

In both commercial and residential water sprinkling systems, it has been conventional in the past to employ means for selectively opening and closing remotely located automatically operated water line valves to selectively operate sprinklers in various areas of such systems.

In my U.S. Pat. No. 2,909,325, I disclosed a sprinkler system wherein sprinkler heads of the pop-up type are utilized. In this system, a small water turbine wheel rotating at relatively high speed effects slow rotation of the sprinkler nozzle means. The instant application is an improvement over the sprinkler head of the aforementioned patent and discloses improved means for dispersing the water therefrom, for transmitting rotating from the turbine wheel to the sprinkler nozzle means, and discloses generally improved sealing means so that leakage or the like is prevented therefrom and dirt cannot enter such sprinkler heads in a manner rendering them inoperative. Further, a unique method of lubricating the internal parts is also disclosed.

SUMMARY OF THE INVENTION

It is an object of this invention to provide an improved means for dispersing fluid under pressure from the sprinkler head of a sprinkler system.

It is a further object of this invention to provide improved means for converting fast rotation of an impeller actuated by fluid under pressure in such sprinkler heads to slow rotation of the nozzle thereof.

It is an even further object of this invention to provide a system which allows for changes in ambient conditions encountered by such sprinkler heads which changes may interfere with the operating parts thereof.

It is still another object of this invention to provide an improved sprinkler head which admits water under pressure and sprays the water therefrom, yet seals out dirt or the like which could interfere with the operation thereof.

It is even another object of this invention to provide an improved sprinkler head, the components of which can be easily and economically manufactured, then preassembled into subassemblies which can be quickly and easily connected together.

These and other objects are preferably accomplished by providing a sprinkler head having a pop-up nozzle actuated by fluid pressure. An impeller is actuated by the fluid flow to rotate the nozzle and thus vary the spray pattern therefrom. A transmission is disposed between the impeller and the nozzle for transmitting rotation of the impeller to the nozzle. The transmission is sealed-off from the fluid passing through the system by a resilient expandable diaphragm at one end a fluid pressure responsive seal is provided in the system in sealing engagement with the nozzle. The sealed-off portion of the transmission is completely filled with a lubricating medium which is free to selectively contract or expand against the diaphragm in response to varying ambient conditions encountered by the sprinkler head. The nozzle may also include means for varying the pattern of the sprayed fluid and may be comprised of molded plastic components which may be assembled together to form the nozzle passages. In addition, varying types of screening means may be provided for screening fluid entering the sprinkler head.

DESCRIPTION OF THE PREFERRED EMBODIMENT

Figure 1:
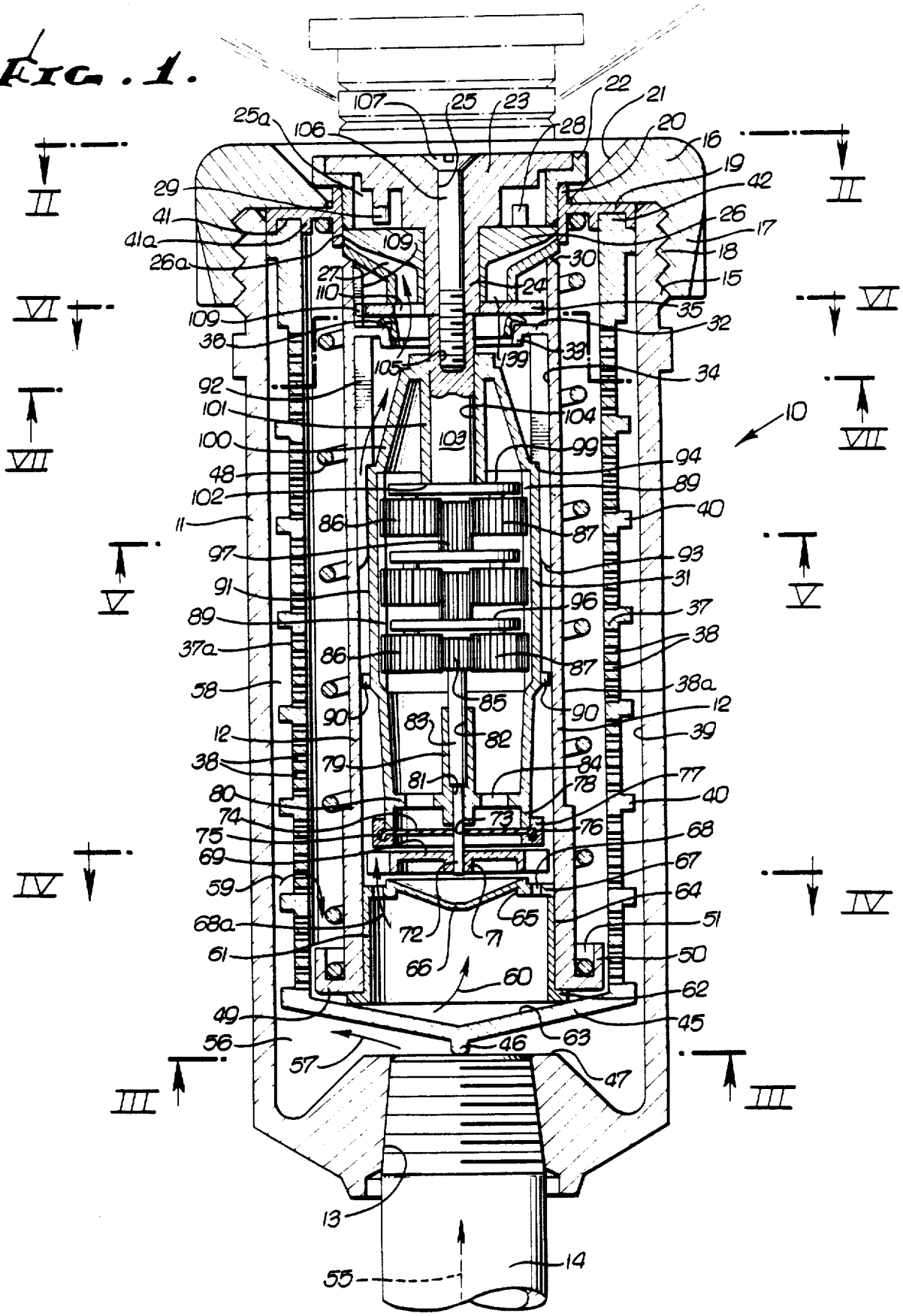
FIG. 1 is an elevational view, partly in section, of a water valve apparatus in accordance with my invention.
Figure 2:
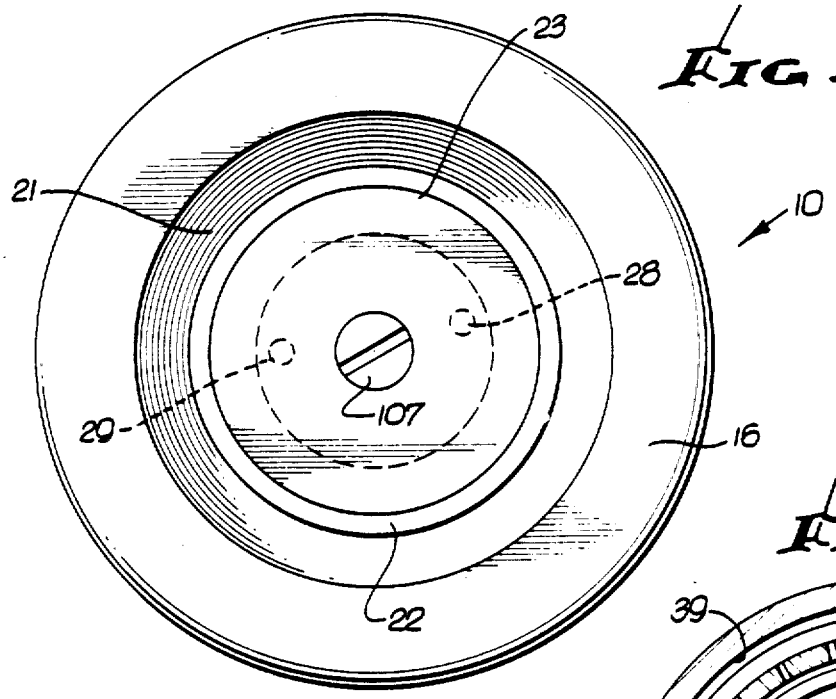
FIG. 2 is a horizontal view of the apparatus of FIG. 1 taken therein along the plane II—II.

Referring to FIG. 1 of the drawing, a sprinkler head 10 is shown having an outer generally cylindrical housing 11 and a coaxially mounted generally cylindrical inner housing 12. Housing 11 is reduced at its lower end and internally screw-threaded to form a water inlet 13. A water supply line 14 is screw-threaded therein as shown. The upper end of housing 11 is open and includes screw-threads 15 on the upper outer periphery thereof. A cap 16, having a downwardly extending marginal flange 17 with threads 18 on the inner periphery thereof, is screw-threaded onto threads 15 as shown.

The inner housing 12 is a riser slidably mounted within outer housing 11 and is arranged to protrude from cap 16 as shown in the dotted lines. A channelled ring member 19 is disposed below cap 16 and includes a generally vertical cylindrical wall 20 with housing 12 slidable therealong. As can be seen in FIG. 1, the upper surface of cap 16 is bevelled as at 21 to form a cavity or the like for seating a nozzle cap ring 22 (See also FIG. 9). A nozzle cap 23 seats on ring 22 and includes a downwardly extending tubular portion 24 having an axial passageway 25 extending therethrough.

As can be seen in FIG. 1, the underside of cap 23 is configured so that it makes a tight seal with ring 22 but leaves a space 25a between ring 22, cap 23 and the top of nozzle 26. As will be discussed further hereinbelow, nozzle 26 includes a plurality of spaced passageways 27 (See also FIG. 9) communicating at the bottom with tne interior of housing 12 and at the top with the outer periphery 26a of nozzle 26 (See also FIG. 9).

A dimple 28 is formed on the upper surface of nozzle 26 extending a short distance into space 25. A downwardly extending dimple 29 is also provided on the underside of cap 23. This dimple 29 is also spaced from the upper surface of nozzle 26 so that no interference therebetween is present. As cap 23 is rotated, as will be explained further hereinbelow, dimple 29 engages dimple 28 to transmit rotation to nozzle 26. It can be seen in FIG. 9 that elements 22, 23 and 26 may be quickly and easily snap-fit together to form a nozzle subassembly of the head of FIG. 1.

The underside of nozzle 26 abuts against the top 30 of inner housing 12. In this manner, the downward extent of nozzle 26 is prevented by engagement with top 30.

Transmission means for imparting rotation to cap 23 is disposed within sprinkler head 10 and includes a transmission housing 31 mounted generally coaxially within inner housing 12.

Figure 8:
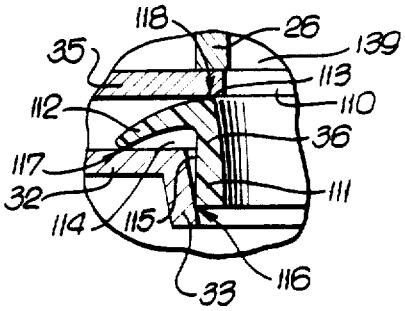
FIG. 8 is a detailed sectional view of a portion of the sealing means of the apparatus of FIG. 1.
Figure 6:
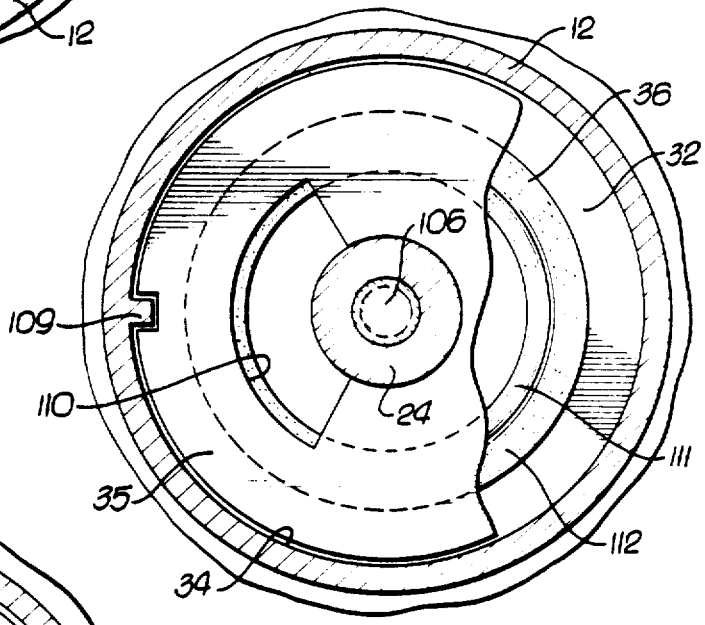
FIG. 6 is a horizontal view, partly in section, of the apparatus of FIG. 1 taken therein along the plane VI—VI.

A peripheral flange 32, having a downwardly extending lip portion 33, is integral with the inner wall 34 of inner housing 12. As can be seen in FIG. 1, an apertured disc 35 (See also FIG. 6) is disposed between the bottom of nozzle 26 and the top of flange 32. Means for sealing these members in the form of a resilient sealing ring member 36, the exact structure of which will be described further hereinbelow with respect to FIG. 8, is disposed between the underside of disc 35 and the top of flange 32 (and also the outer surface of lip portion 33 as shown).

Screening means in the form of a generally cylindrical screen member 37, having a plurality of openings 38 therein, is mounted in sprinkler head 10 between the outer wall 38a of inner housing 12 and the inner wall 39 of outer housing 11. Screen member 37 may include a plurality of horizontally and peripherally extending ribs 40 as shown and ring member 19 may include a peripheral channel 41 or the like separated by a divider wall 41a, for receiving in one side thereof the upper end 42 of screen member 37 in close-fitting relationship. Ring member 41 is preferably of a yieldable material, such as plastic or the like, so that when the inner housing 12 is retracted into sprinkler head 10, the ring member 41 acts as a seal between cap 16 and cap ring 22. Thus, when head 10 is inactive, low pressure water is prevented from seeping out of the head 10 and dirt is excluded from entering. Ring member 41 also wipes clean the outer wall 38a of inner housing 12 when it is retracted back into head 10.

Figure 4:
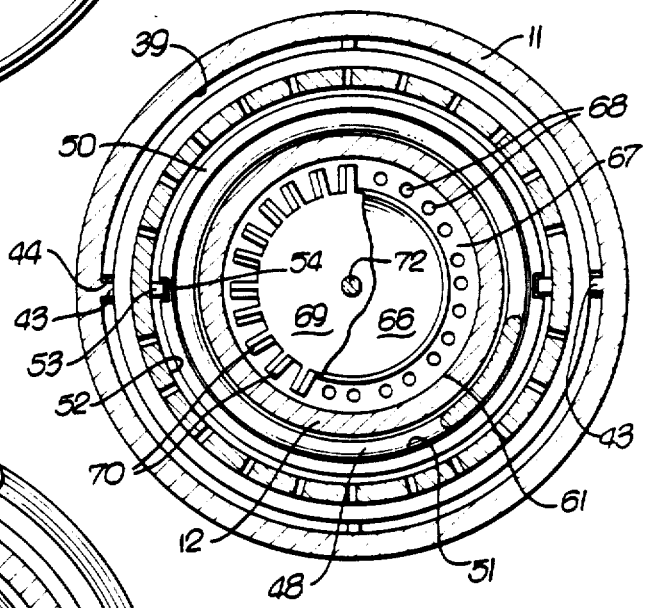
FIG. 4 is a horizontal view, partly in section, of the apparatus of FIG. 1 taken therein along the plane IV—IV.

As shown in FIG. 4, the inner wall 39 of outer housing 11 may include longitudinally extending spaced splines 43 of the like for receiving notches 44 or the like on the upper end 42 of screen member 37 so that rotation is prevented between screen member 37 and housing 11 and the screen member 37 is properly aligned therein.

Figure 3:
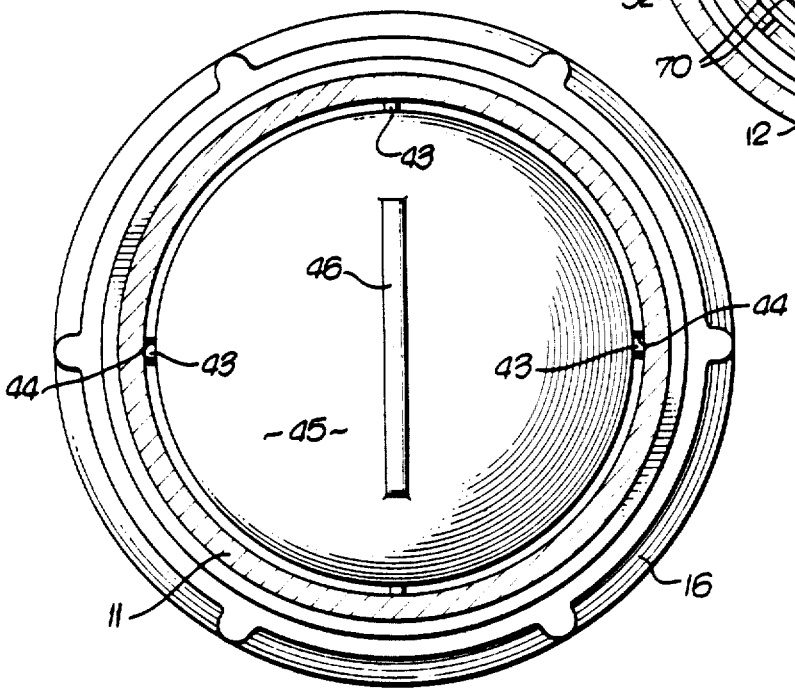
FIG. 3 is a horizontal view, partly in section, of the apparatus of FIG. 1 taken therein along the plane III—III.

The lower end 45 of screen member 37 is generally conically shaped as shown terminating in a rib 46. Rib 46, as shown in FIG. 3, extends transverse of the interior of housing 11 and abuts against the upper end 47 of inlet 13. Finally, a return spring 48 is interposed between the other side of channel 41 of bearing member 19 and a peripheral lip portion 49, having an upstanding portion 60 forming a channel 51 or the like, integral with the bottom of inner housing 12. Spring 48 thus urges inner housing 12 from its retracted position in FIG. 1 to its extended position (indicated by the dotted lines at the top of sprinkler head 10 in FIG. 1).

As shown in FIg. 4, the inner wall 52 of screen member 37 may also have one or more longitudinally extending splines 53 for engaging notches 54 formed on the outer periphery of the upstanding portion 50 of inner housing 12 for keying the inner housing 12 to its proper non-rotating position within screen member 37.

A more complete description of the operation of sprinkler head 10 will be given further hereinbelow. However, for convenience of illustration, fluid, such as water, enters inlet 13, as indicated by arrow 55, passes into the space 56 formed between the bottom of the lower end 45 of screen member 37 as indicated by arrow 57, then enters the space 58 formed between the outer wall 38 of screen member 37 and the inner wall 39 of housing 11.

As indicated by arrow 59, the fluid then enters openings 38 in screen member 37 and enters, as indicated by arrows 60, upwardly into the interior of inner housing 12.

The means for impelling fluids entering inner housing 12 as indicated by arrow 60 and out of the top thereof will now be described. Such means may include an inverted apertured cup member 61 having a bottom peripheral lip portion 62 adapted to abut the top surface 63 of the lower end 45 of screen member 37. Cup member 61 includes a generally cylindrical wall 64 press-fitting into the bottom of inner housing 12. The aperture 65 at the top of cup member 61 is closed off by a dish-shaped member 66 integral therewith. The peripheral wall 67 forming aperture 65 includes a plurality of spaced openings 68, which may be either circular in cross-section, as shown in FIG. 4, or square, or any other suitable configuration through which fluid exits as indicated by arrow 68a. Transmission housing 31 is mounted within inner housing 12 as previously described and carries a rotor 69 having a plurality of impeller blades 70 spaced thereabout (See FIG. 4) at its lower end. The plane of these blades 70 may be angled from the vertical (i.e., inclined) to assit in the impelling of fluids striking such blades 70. Rotor 69 includes a generally centrally located apertured boss 71 or the like for receiving a pin 72 in tight press-fitting relationship.

As particularly contemplated within the present invention, the transmission housing 31 is provided with expandable diaphragm means. In the exemplery embodiment, such diaphragm means comprises a pin 72 which passes through a suitable aperture 73 generally centrally located in an expandable diaphragm 74, which may be of rubber or the like. Diaphragm 74 includes a peripheral downwardly extending lip portion 75 snap-fitting into a groove 76 of a ring member 77. Groove 76 may be bevelled on its inner surface.

The transmission housing 12, which may be made up of one or more parts snap-fitting or otherwise secured together, has its lower end 78 press-fitting or the like into ring member 77. Thus, diaphragm 74 is retained therein by ring member 77 and the lower end 78 of housing 12.

The lower end 78 of housing 12 includes an upstanding boss 79 centrally mounted on a divider wall 80. Boss 79 has an aperture 81 at its lower end communicating with a passageway 82 at its upper end. Pin 72 is press-fit at its upper end into apereture 81 and into a first shaft 83 press-fit or the like in passageway 82 as indicated by the dotted lines. Divider wall 80 includes a plurality of spaced openings 84 therein surrounding boss 79.

Figure 5:
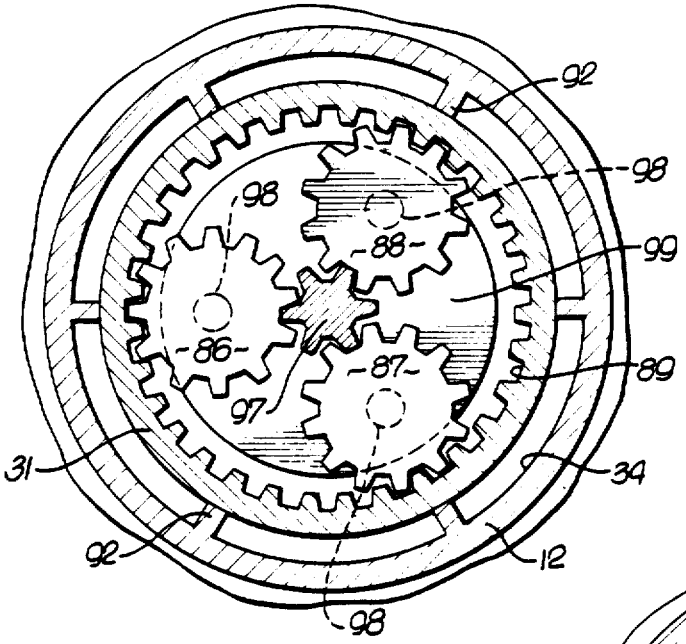
FIG. 5 is a horizontal view, partly in section, of the apparatus of FIG. 1 taken therein along the plane V—V.

The reduction gearing means of the transmission means will now be described. Such means may include a small center gear 85 which is either press-fit onto shaft 83 or otherwise rotatable therewith. This gear 85 is in meshing engagement with a first set of a plurality of larger diameter planetary gears 86 through 88 (See FIG. 5), three such gears being shown, which are in meshing engagement with the splined inner surface 89 of transmission housing 31.

As can be seen in FIG. 1, a plurality of spaced protruberances 90 extend about the outer periphery 91 of transmission housing 31 for properly aligning the transmission housing 31 within inner housing 12. A plurality of spaced longitudinally extending ribs 92 are disposed about the inner wall 34 of inner housing 12 below flange 32. These ribs 92 include a first tapered portion 93 for guiding transmission housing 31 into the upper portion of inner housing 12, then an abutment portion 94 for stopping the upward movement of transmission housing 31. In this manner, transmission housing 31 may be quickly and easily properly aligned within and spaced from the inner wall 31 of inner housing 12 (See also FIG. 5).

The planetary gears 86 through 88 are rotatably carried on pins 95 integral with and depending downwardly from a generally circular plate 96. Any suitable means may be provided for rotatably mounting such gears on pins 95 while retaining gears 86 through 88 in their proper location within transmission housing 31.

A small center gear 97 is carried by the top of plate 96 and rotatable therewith. Gear 97 is in meshing engagement with a second set of planetary gears 86 through 88 also in meshing engagement with splined surface 89. A second plate 96 with pins 98 thereon carries the second set of gears 86 through 88 as described hereinabove. A second gear 97 is disposed at the top of plate 96 and in meshing engagement with a third set of planetary gears 86 through 88 also in meshing engagement with splined surface 89. These latter gears are also rotatably mounted on pins 98 depending downwardly from top plate 99. Plate 99 thus differs from plate 96 previously described in that no center gear is carried at the top thereof.

The upper end of transmission housing 31 terminates in a generally frusto-conically shaped portion 100 having a generally axially and downwardly extending apertures boss 101 therein. The bottom 102 or lowermost portion of boss 101 abuts against the upper surface of plate 99.

A sleeve member 103 is press-fit or the like in a fluid-tight manner into aperture 104 of boss 101. Sleeve member 103 includes an axially extending threaded aperture 105 communicating with passageway 25 in nozzle cap 23. Finally, a threaded bolt 106 extends through passageway 25 and is threaded into aperture 105 for fixedly connecting the cap 23 to sleeve member 103 and thus to the transmission housing 31. The slotted head 107 of bolt 106 may be selectively loosened or tightened, as by means of a screwdriver or the like.

It can be seen from the foregoing that the various elements carried by the transmission housing 31, i.e., including rotor 69, diaphragm 74 and the various gears and means for connection thereof can also be quickly and easily snap-fit together to form a transmission subassembly for the sprinkler head 10. In addition, the transmission subassembly is completely sealed off from fluids entering head 10 through water inlet 14. Further, the previously described nozzle subassembly (See FIG. 9) can be quickly and easily coupled to the transmission subassembly via bolt 106.

The assembly of the various components to make up the completed sprinkler head 10 will not be described. First, spring 48 is mounted on the outer wall 38a of inner housing 12 and retained at its lower end in channel 51. Ring member 19 is now placed on housing 12 above the upper end of spring 48. The spring 48 is retained within channel 41. Cap 16 is now placed over ring member 19. The disc 35 and ring member 36 are assembled in inner housing 12 as shown in FIG. 1. Elements 22, 23 and 26 are then pre-assembled as described hereinabove with respect to FIG. 9 to make up the nozzle subassembly and placed onto the open upper end of housing 12. The transmission subassembly is also pre-assembled as previously described. These assemblies may now be connected together within housing 12 via bolt 106 with disc 35 and ring member 36 disposed between the subassemblies. The transmission housing 31 is keyed within inner housing 12 as previously described. Cup member 61 may now be press-fit into the open bottom of housing 12 below rotor 69.

Screen member 37 may now be mounted within outer housing 11 and keyed therein as previously described. The previously completed nozzle-transmission-cap subassembly may now be inserted into the screen member-outer housing aub-assembly and keyed therein as previously described to form the final assembled sprinkler head 10 when cap 16 is threaded onto the top of outer housing 11.

The operation of the assembled sprinkler head 10 will now be described with respect to FIG. 1. The fluid, such as water, under pressure enters the bottom of head 10 through inlet 13 as previously described. The fluid is jetted through openings 68 and against the inclined blades 70 of rotor 69. The blades 70 are rotated while the fluid is thrown centrifugally outwardly so that it rushes up the space formed between the outer wall 91 of the transmission housing 31 and the inner wall 34 of inner housing 12. This force acting on housing 12 overcomes the force of spring 48, causing inner housing 12 to extend to the dotted line position in FIG. 1 (i.e., the nozzle assembly carried by housing 12 pops-up to the FIG. 1-dotted line position) with the fluid sprayed out of passageways 27 as indicated by arrow and the dotted lines. The resilient ring member 19 prevents dirt or the like from entering into housing 11. The compression of spring 48 and the portion 50 of inner housing 12 controls the upward extent of the nozzle assembly 22, 23 and 26.

As soon as nozzle assembly 22, 23 and 26 is clear of cap 16, water flowing against the inclined blades 70 of rotor 69 rotates first center gear 85 via connecting pin 81, which in turn actuate the first set of planetary gears 86 through 88. These gears 86 through 88 in turn rotate the various plates 99 and the transmission housing 31 and the remaining gears in the gear reduction system all as previously described. Due to this reduction gear system, the nozzle assembly 22,23,26, coupled to trasmission housing 31 via bolt 106, revolves at a reduced rate. In this manner, the rate of revolution of the nozzle assembly 22,23,26 and thus the amount of spraying of water from passageways 17 may be controlled. Of course, the total number, size and location of the gears may be varied accordingly. For example, although three sets of center gear and planetary gears have been described, the total number of sets of gears may vary. Also, the reduction at each stage may be varied. For example, an 8:1 reduction may exist at each stage. Thus, the relatively fast rotation of rotor 69 is converted into slow rotation of nozzle 26 via cap 23.

It is to be understood that, aside from pin 81 and diaphragm 74, all of the components making up the transmission subassembly may be made of a suitable plastic material or the like. Such material permits the snap-fitting of parts as previously described and results in a relatively inexpensive and durable subassembly. However, it is desirable to lubricate the inner working parts (i.e., the various gears) of the transmission subassembly. Thus, the entire interior of the transmission subassembly may be filled with a suitable lubricant having a different coefficient of expansion than the plastic used in manufacturing the transmission subassembly. That is, the transmission subassembly is vacuum-sealed with a suitable lubricant. This difference in coeffients is important because temperature differences between the fluid entering the head 10 and the ground or the like in which it is mounted are generally different. Such differences may result in an expansion of the lubricant with resulting damage to the transmission subassembly unless a lubricant of a differing coefficient than the coefficient of the materials of the transmission subassembly is used.

It can be seen in FIG. 1 that the lip portion 75 of diaphragm 74 forms a bead about its outer edge which fits snugly into the groove 76 of ring member 77. Thus, diaphragm 74, which is resilient and expandable, may expand with its lip portion 75 retained against the bevelled lip of groove 76 trapping diaphragm 74 between ring member 77 and the bottom of transmission housing 31. The diaphragm 74 can thus expand as the lubricant changes its volume.

The disc 35 which is situated below nozzle 26 may be keyed to a spline 109 on the inner wall 34 of inner housing 12 above flange 32 as shown in FIG. 1. As also shown in FIG. 1, disc 35 may have an opening 110 therein so configured as to close off one side of the passageways 27 while opening the other side. Since disc 35 is keyed to inner housing 12 and thus remains stationary while nozzle 26 rotates, the pattern of spray may be varied. That is, as the passageways 27 are rotated over the stationary guide disc 35, the water enters differing passageways 27 in nozzle 26. Of course, discs similar to disc 35 with various types of openings therein may be substituted for disc 35 to obtain any desired spray pattern.

As particularly contemplated within the present invention, sealing means are provided for sealing the interior of inner housing 12 so that fluids cannot bypass housing 12 when entering nozzle 26. In the exemplary embodiment, such sealing means comprises, as shown in FIG. 8, a ring member 36. Ring member 36 is comprised of a resilient material and includes a first generally vertically extending ring portion 111 and an integral generally horizontal flange portion 112. The intersection of these portions 111 and 112 forms a lip 113 which abuts against the underside of disc 35 as shown in FIG. 8. However, flange portion 112 extends from lip 113 generally outwardly and downwardly as shown to thus form a space 114 when it is seated on top of flange 32. It can also be seen that the lip portion 33 of the flange 32 of inner housing 12 is inclined from the vertical, that is, extends generally downwardly and outwardly as shown, to form a second space 115 between lip portion 33 and ring portion 111 when ring member 36 is seated as shown.

The foregoing is the normal position of ring member 36 when in its operative position within inner housing 12. The lip 113 is thus squeezed under disc 35 and a water-tight seal is created at the point of contacts 116, 117 and 118. Water pressure on ring member 36 at point of contact 116 causes the ring member 36 to seat; however, the resiliency of ring member 36, at lip 113 and point of contact 118, permits a slight amount of up and down travel. That is, since disc 35 is of metal or the like and nozzle 26 is of plastic or the like, a problem is encountered in maintaining a seal between such dissimilar materials. However, ring member 36 acts as a spring holding disc 35 firmly up against the bottom of nozzle 26. Even if nozzle 26 wears during use, the ring member 36 bears against the underside of disc 35 to maintain disc 35 in sealing engagement with the bottom of nozzle 26. In fact, such seal may even be improved during wear. The resiliency of ring member 26 and the aforementioned configuration thereof, together with the configuration of flange 32 and the spaces formed therebetween, assist in carrying this out.

Figure 10:
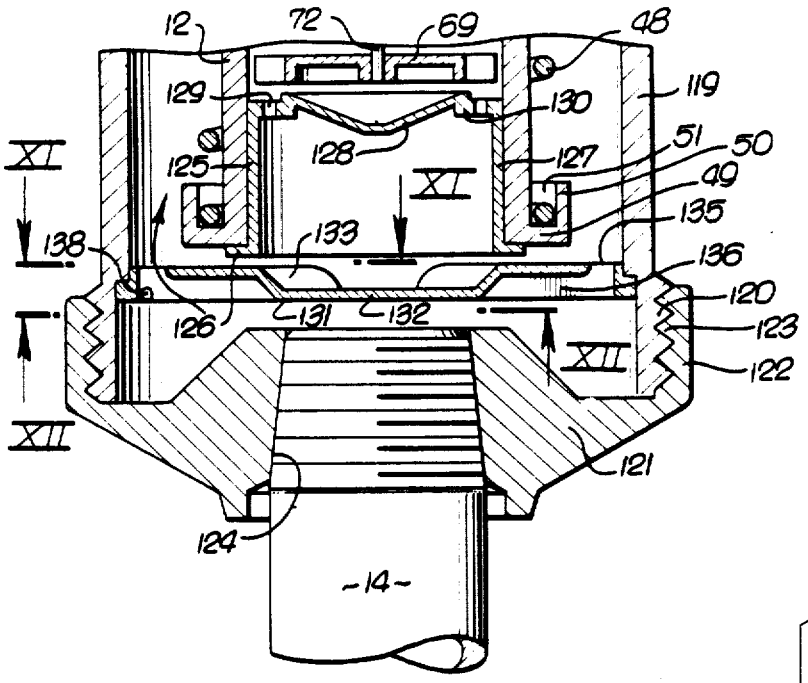
FIG. 10 is a partial sectional elevational view of a modification of a portion of the apparatus of FIG. 1.

Referring now to FIG. 10 wherein like numerals refer to like parts of the sprinkler head 10 of FIG. 1, outer housing 12 of FIG. 1 may be modified by providing an outer housing 119 having screw-threads 120 on its outer peripheral bottom thereof. A separate outer housing bottom portion 121 having an upwardly extending generally circular portion 122 which screw-threads 123 on the inner periphery thereof may be screw-threaded onto screw-threads 120. Water inlet 124 having internal threads therein is carried by bottom portion 121 for connection to water supply line 14.

In this embodiment, the cup member 61 of FIG. 1 may also be modified and, as shown in FIG. 10, is of a unitary construction. That is, cup member 125 has a lip portion 126 similar to lip portion 62 and a cylindrical wall 127 similar to wall 64. However, disc-shaped portion 128 is integral with cylindrical wall 127. Openings 129 are thus part of portion 128 and formed in the top generally horizontally extending peripheral wall 130 as shown.

Figure 11:
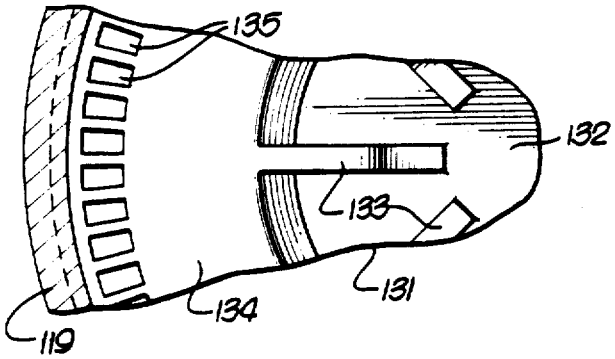
FIG. 11 is a partial horizontal view, partly in section, of the apparatus of FIG. 10 taken therein along the plane XI—XI.
Figure 12:
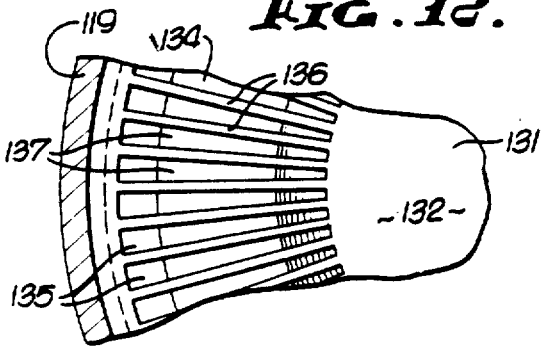
FIG. 12 is a partial horizontal view, partly in section, of the apparatus of FIG. 10 taken therein along the plane XII—XII.

Further, screen member 37 may be eliminated and replaced by a disc-shaped screen filter 131 (See also FIGS. 11 and 12). As shown in FIG. 11, filter 131 includes a depressed central portion 132 having a plurality of spaced radially extending ribs 133 on its upper surface (See also FIG. 10). Filter 131 also includes an outer portion 134 having a plurality of spaced openings 135. These openings 135 are generally rectangular, as shown, at the upper surface of filter 131. However, as shown in FIG. 12, the underside of outer portion 134 includes a plurality of radially outwardly and downwardly extending elongated members 136 forming a web. These members 136 may be generally triangular in cross-section and may also form generally triangular spaces 137 between adjacent members 136 as clearly shown in FIG. 12. That is, the web tapers from the point of engagement with central portion 132 to the openings 135 so that, as can be seen in FIG. 10, if a piece of dirt 138 or the like enters the web, it is pushed to the outside and water can bypass the dirt 138 to enter the interior of housing 11 via openings 135 as indicated by arrow 141.

Figure 7:
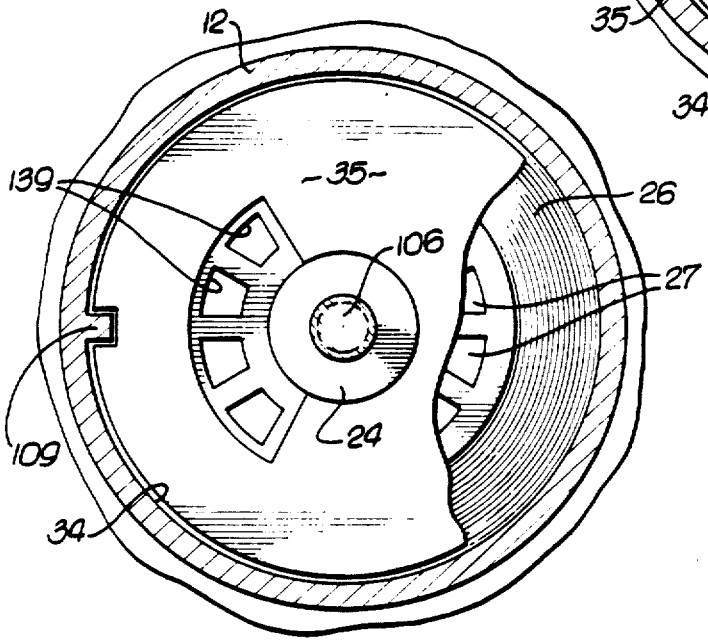
FIG. 7 is a horizontal view, partly in section, of the apparatus of FIG. 1 taken therein along the plane VII—VII.
Figure 9:
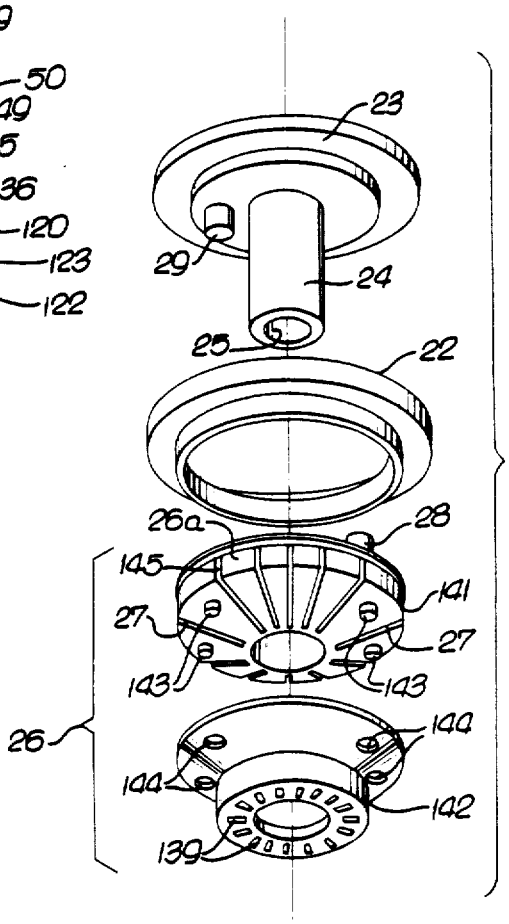
FIG. 9 is an exploded view, in perspective, of the subassembly of a portion of the apparatus of FIG. 1.
Figure 13:
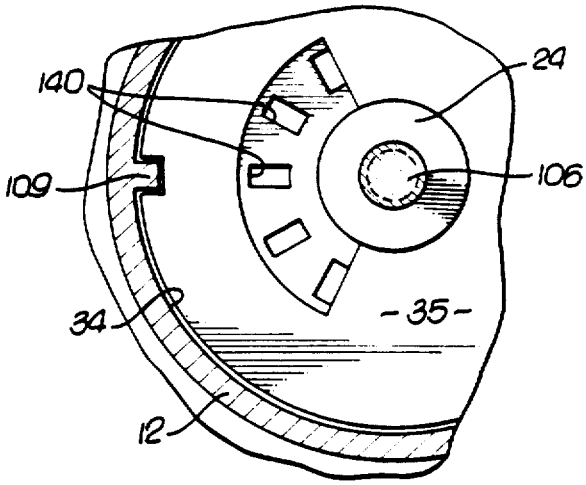
FIG. 13 is a partial horizontal view, partly in section, of a modification of the portion of the apparatus of FIG. 7.

As discussed hereinabove, with respect to FIGS. 1 and 9, as nozzle cap 23 is rotated, dimple 29 engages dimple 28 on nozzle 26 to also rotate the same. This engagement directs the spray through passageways 27 in a more thorough pattern. The openings 139 at the bottom of nozzle 26 leading into passageways 27 have been illustrated in FIG. 7 as being generally trapezoidal in cross-section; however, as shown in FIG. 13, these openings 140 may be generally rectangular in cross-section, if desired. The variation in configuration of such openings 139, and 140 enables one to obtain better control over the disposition of water. The two configurations described hereinabove are given by way of example only; obviously, openings 139 and 140 may be triangular, square, or any other suitable configuration. Further, nozzle 26 has been described as of unitary construction; however, nozzle 26 may be comprised of two or more parts secured together in any suitable manner. In the latter case, various components which include the openings 139 and 140 leading into passageways 27 may be substituted as desired.

Thus, referring once again to FIG. 9, nozzle 26 may be comprised of an upper housing portion 141 and a lower housing portion 142. Upper housing portion 141 may have a plurality of spaced depending dimples 143 which fit into a plurality of like spaced apertures 144 on lower housing 142. Passageways 27 have three sides thereof on upper housing portion 141 which are closed off on their fourth sides by the inter-engagement of portions 141, 142. The orifices 145 on the outer periphery 26 of upper housing portion 141 are closed off by engagement with the margin 146 of lower housing portion 142. These two portions may be welded together, as by solvent or sonic means, to obtain the integral nozzle 26 of FIG. 1.

Other than the materials specifically referred to hereinabove, any suitable materials, such as plastic or the like, may be used throughout the sprinkler head 10. It can be seen from the foregoing that I have described an improved sprinkler head having a pop-up nozzle which head screens out dirt or the like while rotating the nozzle thereof under reduced speed. The means for rotating the nozzle is well lubricated and sealed off from the water flowing through the sprinkler head.

I claim:

1. In a sprinkler system having fluid under pressure flowing therethrough, and a sprinkler head operatively connected to said system having a nozzle for dispersing said fluid therefrom, the improvement which comprises:

impeller means associated with said head operatively engaging said nozzle for rotating said nozzle in response to said fluid passing through said system, said impeller means including transmission means for transmitting movement of said impeller to said nozzle, said transmission means being sealed off from engagement by said fluid at one end by an expandable diaphragm separating said transmission means from said fluid and closed-off in a fluid-tight manner at the other end and a lubricating medium completely filling the sealed-off portion of said transmission means, said lubricating medium being free to selectively contact or expand thereby displacing said diaphragm in response to varying ambient conditions encountered by said sprinkler head.

2. In the sprinkler system of claim 1 wherein the lubricating medium is of a differing coefficient of expansion than the materials comprising said transmission means.

3. In the sprinkler system of claim 1 wherein said transmission means includes reduction gearing means disposed in said sealed-off portion and in operative engagement with said impeller means for transmitting rapid rotation of said impeller means to slow rotation of said nozzle.

4. In the sprinkler system of claim 1 wherein screening means is disposed in said sprinkler head adapted to screen fluid entering said system before said fluid contacts said impeller means.

5. In the sprinkler system of claim 4 wherein said screening means includes a screen member encircling said impeller means, said screen member having a plurality of openings therein for screening fluids passing therethrough.

6. In the sprinkler system of claim 4 wherein said screening means includes a screening member disposed within said sprinkler head in contact with said fluid entering therein, said screening member having a main central imperforate body portion and a plurality of radially outwardly extending upstanding ribs, said ribs forming generally triangular openings between adjacent ribs, said triangular openings tapering from said central body portion outwardly to the periphery of said screening member forming a plurality of peripheral spaced openings disposed about the periphery of said screening member and in fluid communication with the spaces between adjacent ribs, the portion of said screening member between said peripheral openings and said central body portion also being imperforate.

7. In the sprinkler system of claim 1 wherein said nozzle includes a first nozzle cap portion operatively connected to said impeller means and rotatable thereby, and a main nozzle body having a plurality of passageways extending therethrough, said passageways having openings leading into said passageways for receiving fluid from said impeller means and orifices leading from said passageways, for spraying fluid therefrom, and means associated with both said nozzle cap portion and said main nozzle body for transmitting rotation of said nozzle cap portion by said impeller means to said main nozzle body.

8. In the sprinkler system of claim 1 wherein said main nozzle body includes an upper nozzle body portion and a lower nozzle body portion, three sides of said passageways extending through said upper nozzle body portion and leading into said orifices with said orifices open on one side thereof and the fourth side of said passageways and the closing-off of said orifices being formed by the interengagement of said upper and lower nozzle body portions, guide means associated with both of said nozzle body portions for guiding said nozzle body portions into interengagement in a manner whereby said fourth sides closes off said passageways and said orifices in said upper nozzle body portion in a fluid-tight manner, and said openings being disposed on said lower nozzle body portion.

9. In the sprinkler system of claim 8 wherein said upper and lower nozzle body portions are welded together.

10. In the sprinkler system of claim 7 wherein said openings are generally trapezoidal in cross-section.

11. In the sprinkler system of claim 7 wherein said openings are generally rectangular in cross-section.

[12. In a sprinker system having fluid under pressure flowing therethrough, and a sprinkler head operatively connected to said system having a nozzle for dispersing said fluid therefrom, said nozzle having a plurality of passageways extending completely therethrough, the improvement which comprises:

impeller means associated with said head operatively engaging said nozzle for rotating said nozzle in response to said fluid passing through said system, said impeller means enclosed by a housing having an upper portion and an open lower end for receiving said fluid therein, and sealing means disposed between the upper portion of said housing and said nozzle for preventing fluid entering said housing from passing between the upper portion of said housing and said nozzle while permitting said fluid to flow out of the passageways in said nozzle, said sealing means being adapted upon application of fluid under pressure to increase the pressure between it and said nozzle and the upper portion of said housing.]

13. [In the sprinkler system of claim 12] *In a sprinkler system having fluid under pressure flowing therethrough and a sprinkler head operatively connected to said system having a nozzle for dispersing said fluid therefrom, said nozzle having a plurality of passageways extending completely therethrough, the improvement which comprises:*

*impeller means associated with said head operatively engaging said nozzle for rotating said nozzle in response to said fluid passing through said system; said impeller means enclosed by a housing having an upper portion and an open lower end for receiving said fluid therein, and sealing means disposed between the upper portion of said housing and said nozzle for preventing fluid entering said housing from passing between the upper portion of said housing and said nozzle while permitting said fluid to flow out of the passageways in said nozzle, said sealing means being adapted upon application of fluid under pressure to increase the pressure between it and said nozzle and the upper portion of said housing; and* wherein said impeller means includes transmission means therein for transmitting movement of said impeller means to said nozzle, said transmission means being enclosed by a second housing and an expandable diaphragm seal disposed within said second housing between said impeller means and said transmission means.

[14. In the sprinkler system of claim 12 further including template means associated with said sprinkler head disposed between said nozzle and said sealing means adapted to set a predetermined pattern of spray of fluid under pressure from said nozzle.]

[15. In the sprinkler system of claim 14 wherein said template means is a metallic disc having aperture means therein shaped for providing said predetermined pattern of spray in a fluid communication with the fluid entering said sprinkler head and in selective fluid communication with the passageways of said nozzle.]

16. [In the sprinkler system of claim 15] *In a sprinkler system having fluid under pressure flowing therethrough, and a sprinkler head operatively connected to said system having a nozzle for dispersing said fluid therefrom, said nozzle having a plurality of passageways extending completely therethrough, the improvement which comprises:*

*impeller means associated with said head operatively engaging said nozzle for rotating said nozzle in response to said fluid passing through said system, said impeller means enclosed by a housing having an upper portion and an open lower end for receiving said fluid therein, and sealing means disposed between the upper portion of said housing and said nozzle for preventing fluid entering said housing from passing between the upper portion of said housing and said nozzle while permitting said fluid to flow out of the passageways in said nozzle, said sealing means being adapted upon application of fluid under pressure to increase the pressure between it and said nozzle and the upper portion of said housing; and*

*further including template means associated with said sprinkler head disposed between said nozzle and said sealing means adapted to set a predetermined pattern of spray of fluid under pressure from said nozzle; wherein*

*said template means is a metallic disc having aperture means therein shaped for providing said predetermined pattern of spray in a fluid communication with fluid entering said sprinkler head and in selective fluid communication with the passageways of said nozzle and;* wherein the upper portion of said housing includes an inwardly extending flange having a downwardly extending lip thereon, and said sealing means includes a resilient ring member having a first generally upright portion and an integral generally horizontally extending flange portion, the intersection of both of said portions forming a lip bearing against the underside of said disc with a first space formed between the lip of said housing and the upright portion of said ring member and a second space formed between said flange portion and the flange of the upper portion of said housing.

17. A sprinkler head comprising:

an outer housing;

an inner housing coaxially mounted therein and moveable from a first position within said outer housing to a second position extended from said outer housing;

a nozzle rotatably mounted at the upper end of said inner housing having a plurality of radiating fluid discharge passageways opening beyond said outer housing when said inner housing is extended out of said outer housing, said passageways being in fluid communication with the interior of said inner housing;

biasing means operatively engaging said inner housing for biasing said inner housing to its first position; and impeller means associated with said inner housing in operative engagement with said nozzle for transmitting rotation of said impeller means to said nozzle, said impeller means including transmission means disposed within said inner housing, said transmission means being adapted to convert rapid rotation of said impellar means to slower rotation of said nozzle, said transmission means having a portion sealed-off from the atmosphere with an expandable diaphragm disposed between said sealed-off portion and said impeller means, and a lubricating medium completely filling said sealed-off portion, said lubricting medium being free to selectively contract or expand thereby displacing said diaphragm in response to varying ambient conditions.

18. The sprinkler head of claim 17 wherein said lubricating medium has a differing coefficient of expansion than the coefficient of expansion of the internal portions of said sealed-off portion.

19. In a sprinkler having a head mounting a nozzle for dispersing fluid through said head and out of said nozzle and impeller means associated with said head operatively engaging said nozzle for rotating said nozzle in response to said fluid passing through said head, said impeller means including transmission means for transmitting movement of said impeller means to said nozzl_, the improvement comprising:

sealing means for sealing off at least a portion of said transmission means from engagement by said fluid including a displaceable member separating said transmission means sealed-off portion from said fluid; and a lubricating medium completely filling the sealedoff portion of said transmission means, said lubricating medium being free to selectively contract or expand and thereby displace said member in response to varying ambient conditions encountered by said sprinkler.

20. In the sprinkler of claim 19, wherein said displaceable member is an expandable diaphragm.

*21. In a sprinkler system having fluid under pressure flowing therethrough, and a sprinkler head operatively connected to said system having a nozzle for dispersing said fluid therefrom, said nozzle having a plurality of passageways with bottom and top ends and extending completely therethrough, the improvement which comprises:*

*impeller means associated with said head operatively engaging said nozzle for rotating said nozzle in response to said fluid passing through said system, said impeller means enclosed by a housing having an upper portion and an open lower end for receiving said fluid therein, and sealing means disposed between the upper portion of said housing and said nozzle for preventing fluid entering said housing from passing between the upper portion of said housing and said nozzle while permitting said fluid to flow out of the passageways in said nozzle, said sealing means being adapted upon application of fluid under pressure to increase the pressure between it and said nozzle and the upper portion of said housing;*

*said upper portion of said housing defining an outlet from said housing, said nozzle having a bottom through which the bottom ends of said nozzle passageways extend in overlying relation to said outlet defined by said upper portion of said housing to communicate with the interior of said housing therethrough, and wherein, said sealing means is disposed between said upper portion of said housing defining said outlet and said bottom of said nozzle.*

*22. In the sprinkler system of claim 21 further including template means associated with said sprinkler head disposed between said bottom of said nozzle and said sealing means adapted to set a predetermined pattern of spray of fluid under pressure from said nozzle.*

*23. In the sprinkler system of claim 22 wherein said template means is a metallic disc having aperture means therein shaped for providing said predetermined pattern of spray in a fluid communication with the fluid entering said sprinkler head and in selective fluid communication with the passageways of said nozzle.*

*24. In the sprinkler system of claim 21 wherein an apertured disc is disposed between said upper portion of said housing defining said outlet and said bottom of said nozzle, said aperture in said disc providing fluid communication between said outlet from said housing and the bottom ends of said nozzle passageways, and said seal means is disposed between said upper portion of said housing and said apertured disc.*

*25. In the sprinkler system of claim 24 wherein said upper portion of said housing includes a peripheral flange defining said outlet, and said sealing means is in the form of a resilient sealing ring disposed between the top of said peripheral flange and the underside of said apertured disc.*

*26. In the sprinkler system of claim 25 wherein said peripheral flange defining the outlet from said housing further defines a downwardly extending lip portion and said resilient sealing ring is further disposed between the underside of said apertured disc and the outer surface of said lip portion.*

*27. In the sprinkler system of claim 26 wherein said sealing ring includes a first generally vertically extending ring portion and an integrally formed generally horizontal flange portion with the intersection of said portions forming a lip abutting the underside of said apertured disc, said flange portion extending from said lip and being seated on the upper surface of said peripheral flange of said upper portion of said housing and said vertically extending ring portion extending from said lip of said resilient sealing ring into contact with said downwardly extending lip portion of said peripheral flange.*

*28. In the sprinkler system of claim 24 wherein said apertured disc is stationary relative to said housing and closes off a portion of the bottom ends of said passageways in said nozzle and defines a fluid communication path from the outlet defined by said upper portion of said housing and the remainder of the bottom ends of said passageways in said nozzle.*

*29. In the sprinkler system of claim 25 wherein said apertured disc is stationary relative to said housing and closes off a portion of the bottom ends of said passageways in said nozzle and defines a fluid communication path from the outlet defined by said upper portion of said housing and the remainder of the bottom ends of said passageways in said nozzle.*

*30. In the sprinkler system of claim 28 wherein said sealing means acts as a spring and urges said apertured disc into contact with the bottom of said nozzle.*

*31. In the sprinkler system of claim 29 wherein said resilient sealing ring acts as a spring and urges said apertured disc into contact with the bottom of said nozzle.*

*32. In the sprinkler system of claim 21 wherein said sprinkler head includes an outer stationary housing defining a water inlet connected to said system and said housing enclosing said impeller means is an inner housing slidably mounted within said outer housing and moveable between a first position in which said inner housing is retracted within said outer housing and a second position in which said inner housing protrudes from said outer housing exposing said nozzle therefrom, said inner housing being*

*moveable between said first and second positions by fluid under pressure in said system.*

*33. In the sprinkler system of claim 32 wherein a generally cylindrical screen member is disposed between said outer housing and said inner housing such that water entering said water inlet passes through said screen before entering said open lower end of said inner housing.*

*34. In the sprinkler system of claim 24 wherein said sprinkler head includes an outer stationary housing defining a water inlet connected to said system and said housing enclosing said impeller means is an inner housing slidably mounted within said outer housing and moveable between a first position in which said inner housing is retracted within said outer housing and a second position in which said inner housing protrudes from said outer housing exposing said nozzle therefrom, said inner housing being moveable between said first and second positions by fluid under pressure in said system.*

*35. In the sprinkler system of claim 34 wherein a generally cylindrical screen member is disposed between said outer housing and said inner housing such that water entering said water inlet passes through said screen before entering said open lower end of said inner housing.*

* * * * *